(12) United States Patent
Gebell et al.

(10) Patent No.: US 6,422,581 B1
(45) Date of Patent: Jul. 23, 2002

(54) TRANSPORTING AN ELECTRONIC BAY WITH PIGTAIL CABLES FROM A FABRICATION SITE TO AN INSTALLATION SITE

(75) Inventors: Thomas William Gebell, St. Michael; Pawel K. Simura, St. Louis Park; Thomas A. Feller, Minneapolis, all of MN (US)

(73) Assignee: Computer System Products, Inc., Plymouth, MN (US)

( * ) Notice: Subject to any disclaimer, the term of this patent is extended or adjusted under 35 U.S.C. 154(b) by 0 days.

(21) Appl. No.: 09/781,112

(22) Filed: Feb. 12, 2001

(51) Int. Cl.[7] .................................................. B62B 1/00
(52) U.S. Cl. ..................................................... 280/47.17
(58) Field of Search ........................... 280/47.19, 47.28, 280/47.29, 47.17; 242/129.5, 129.72, 131, 137, 86.5 R

(56) References Cited

U.S. PATENT DOCUMENTS

| | | | | |
|---|---|---|---|---|
| 2,828,928 A | * | 4/1958 | Killisch | 242/128 |
| 3,304,025 A | * | 2/1967 | Zerg | 242/129 |
| 5,915,062 A | * | 6/1999 | Jackson et al. | 242/571.5 |
| 6,007,018 A | * | 12/1999 | Potteiger et al. | 242/400.1 |

* cited by examiner

*Primary Examiner*—Christopher P. Schwartz
*Assistant Examiner*—C. T. Bartz
(74) *Attorney, Agent, or Firm*—Jacobson and Johnson

(57) ABSTRACT

After an electronic bay in its normal upright position has been wired with optical fiber cables at a fabrication site, it is raised from its supports and placed on a transporting cart for shipment to a remote installation site with the cables coiled around cable guides on the cart to prevent sharp bends in the cable then at the installation location the wired bay is lowered in its upright position onto its supports for permanent installation, the cables unwound and the cart removed for reuse.

13 Claims, 4 Drawing Sheets

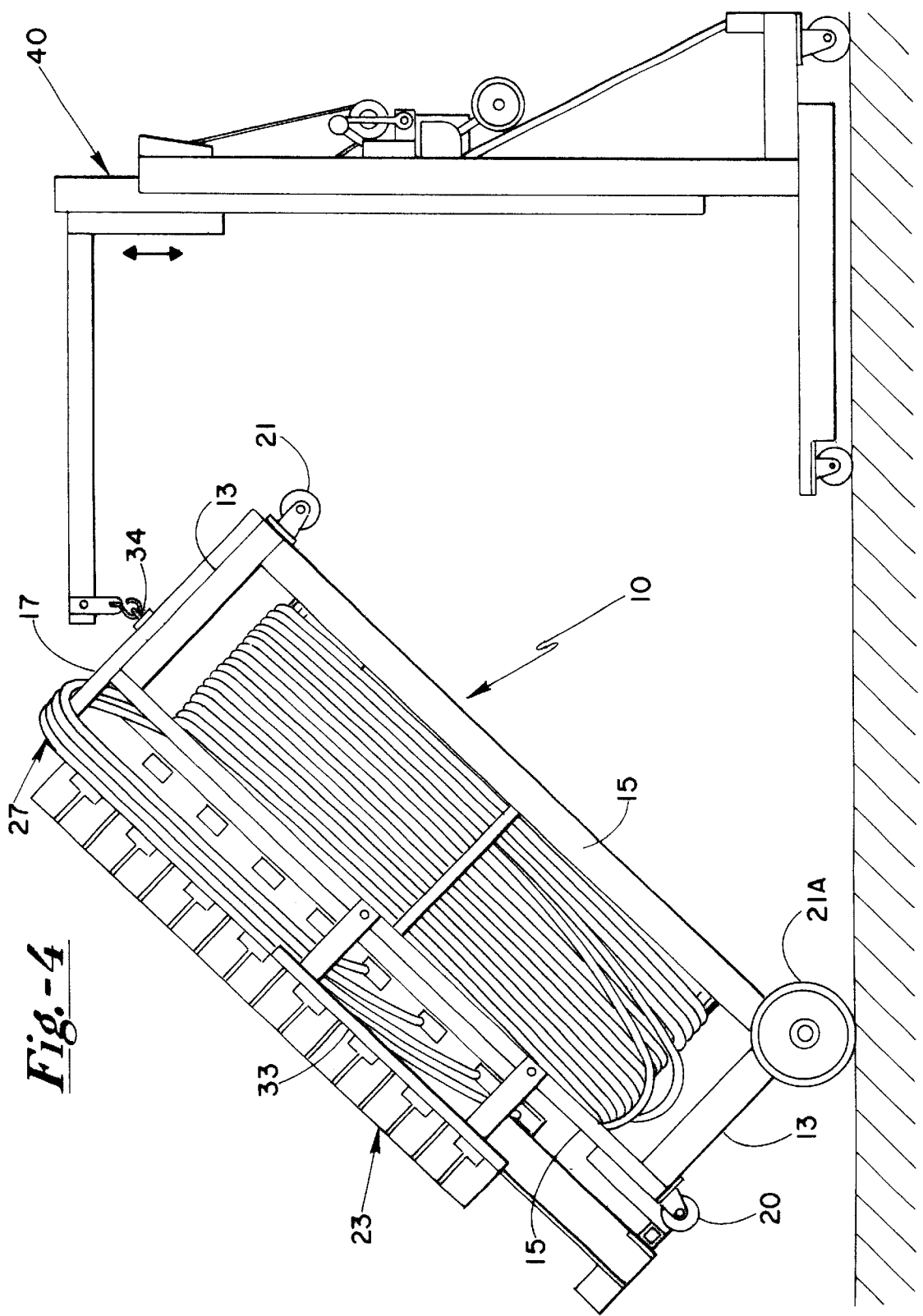

TRANSPORTING AN ELECTRONIC BAY WITH PIGTAIL CABLES FROM A FABRICATION SITE TO AN INSTALLATION SITE

FIELD OF THE INVENTION

An electronic bay; as used herein, comprises a supporting frame with a multiplicity of panels or chassis attached to the frame and wired with pigtail cables, pigtail being defined as a cable in which the conductors in the cables are attached only at one end to the panels or chassis mounted in the bay. The bay is wired at a fabrication site and then transported to a remote site for installation. More particularly, the invention is two-fold, one being the method or process for mounting the wired bay onto a cart and transporting the cart and bay to the installation site and the other being the cart itself.

DESCRIPTION OF THE PRIOR ART

The normal and conventional practice has been to wire an electronic bay at its installation site. In other words, an outer frame is installed and then the chassis or panels are attached or mounted to the frame and the cable conductors then wired to the various panels and/or chassis. It was thought to be too cumbersome and unreliable to wire the bay at one location and then transport it with its multiple cables to another location for installation. This became even more so with the advent of optical fiber cables for wiring electronic bays because it is critical to avoid sharp bends in the optical fiber conductors.

SUMMARY OF THE INVENTION

An electronic bay, as defined hereinabove, is wired at a fabrication site with optical fiber conductors producing a multiplicity of pigtail cables extending from the panels or chassis mounted in the bay. The wired bay is placed on a cart and the cables wound around cable guides on the cart in a manner to avoid any sharp bends in the cable and the cart with attached bay is shipped, usually in a shipping crate, from the fabrication site to the location of the installation site. At the installation location, the cart with attached bay is removed from the shipping crate and transported to the installation site where the bay is put into place, the cables unwound and the cart detached from the bay and removed to make it available for transporting another wired bay. In the preferred embodiment the cart has a pair of spaced-apart rigid frames with the cable guides located in the space between the frames. For transporting the wired bay, the cart is raised to a vertical position alongside the wired bay resting preferably on casters on one end of the cart. The cables are wrapped around the pedestal-style cable guides and the cart is swung around so that the bay rests against the cart. The bay is then removably attached to one of the frames of the cart and then the cart is lowered to a horizontal position and moved, on wheels which are attached to what is then the lower frame, and the combination is then wheeled into a shipping crate. After arrival at the location of the installation site the cart with attached bay is wheeled out of the crate over to the installation site where it is raised to a vertical position. The bay is then detached from the cart, bolted or otherwise mounted to its installation supports and the cables are unwound from the cart and the cart is removed for reuse.

Significant cost reduction has resulted from being able to wire the bay at a fabrication site instead of having the wiring done at the installation site. The use of a cart with the cable guides so that the optical fiber cables are wound without encountering the danger of any sharp bends eliminates or minimizes the danger of damage to the cables in transit.

BRIEF DESCRIPTION OF THE DRAWINGS

FIG. 4 is an illustration of an intermediate step in moving the cart with bay attached.

DESCRIPTION OF THE PREFERRED EMBODIMENTS

Figure 1:
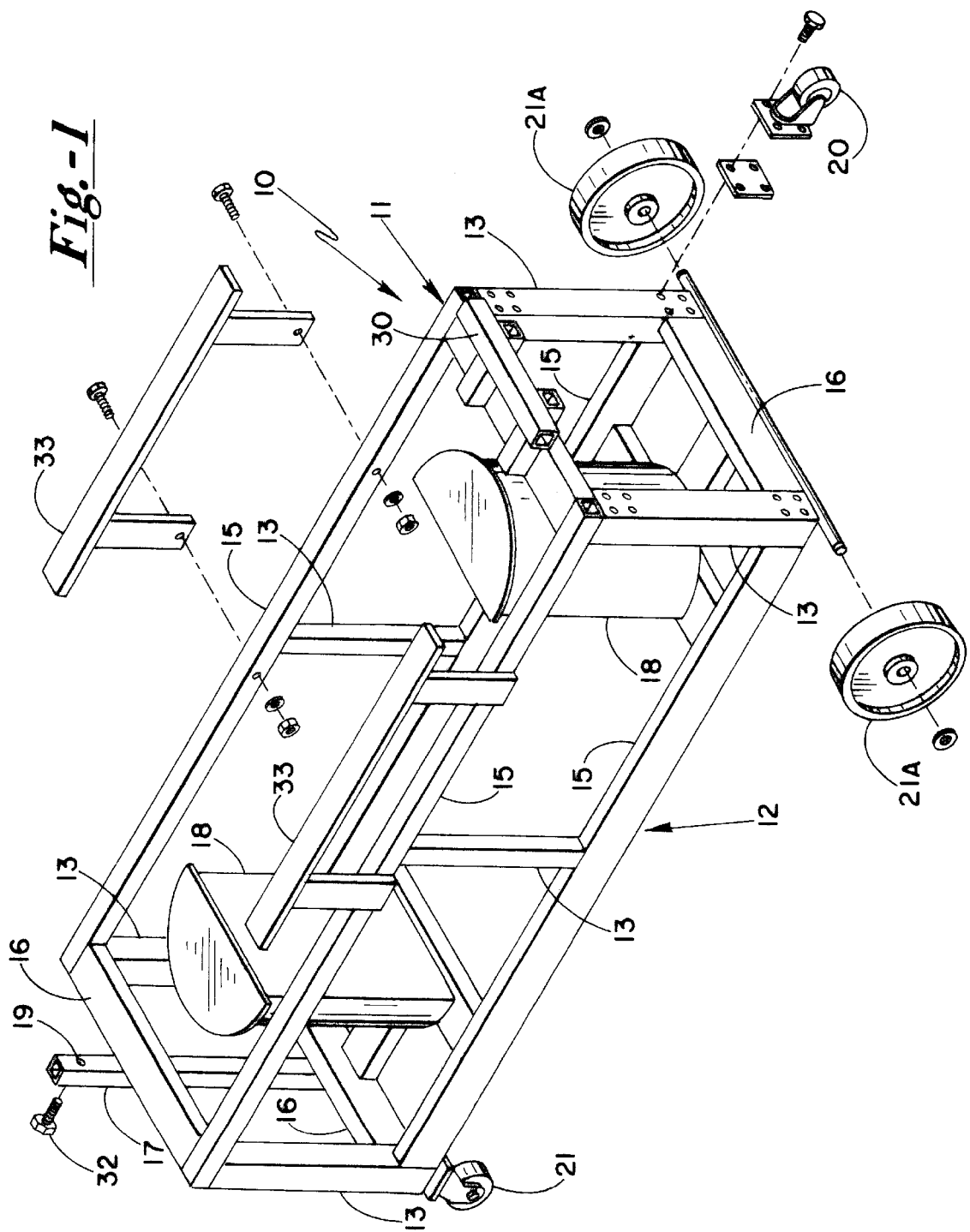
FIG. 1 is a perspective, partial break-away view of a preferred embodiment of the transportation cart.

A cart generally designated by reference numeral 10 has a first generally planar frame 11 and a second parallel planar frame 12 spaced and held apart by corner and side supports 13. Each of the planar frames 11 and 12 comprise side members 15 and end members 16 in a common and conventional fashion. Mounted in the space between frames 11 and 12 on suitable crossmembers attached in conventional fashion to side members 15 are semicylindrical cable-guiding pedestals 18. At the corners of one end of cart 10 attached generally to end members 16 is a set of four casters 20. Attached generally at the corners of frame 12, the lower frame as viewed in FIG. 1, is a set of wheels identified by reference numeral 21. The large set of wheels 21A at one end of frame 12 are designed so that when the cart is in the horizontal position, as illustrated in FIG. 1, the end casters 20 do not come in contact with the floor or other supporting surface that the cart is resting or moving on but when the cart is elevated to the vertical position so that casters 20 are in contact with the supporting surface, then the large wheels 21A do not contact the supporting surface. An elongated arm 17 is welded or otherwise fixedly attached to the end members 16 at one end of cart 10 and has a pass-through opening 19 for the threaded shank of bolt 32 for use in a manner to be described later.

Figure 2:
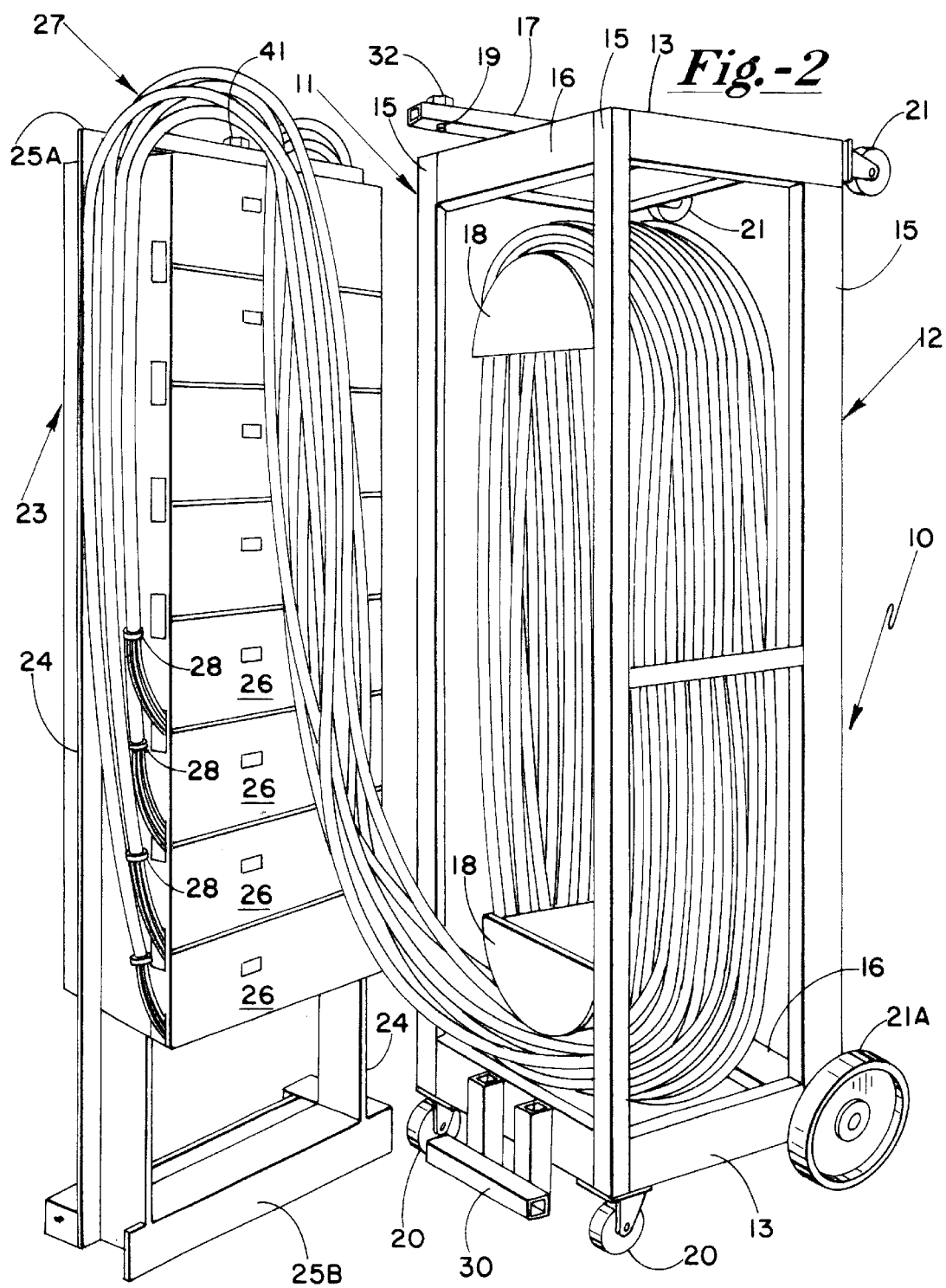
FIG. 2 illustrates a bay with its cables wound on the cart prior to mounting the bay onto the cart.
Figure 3:
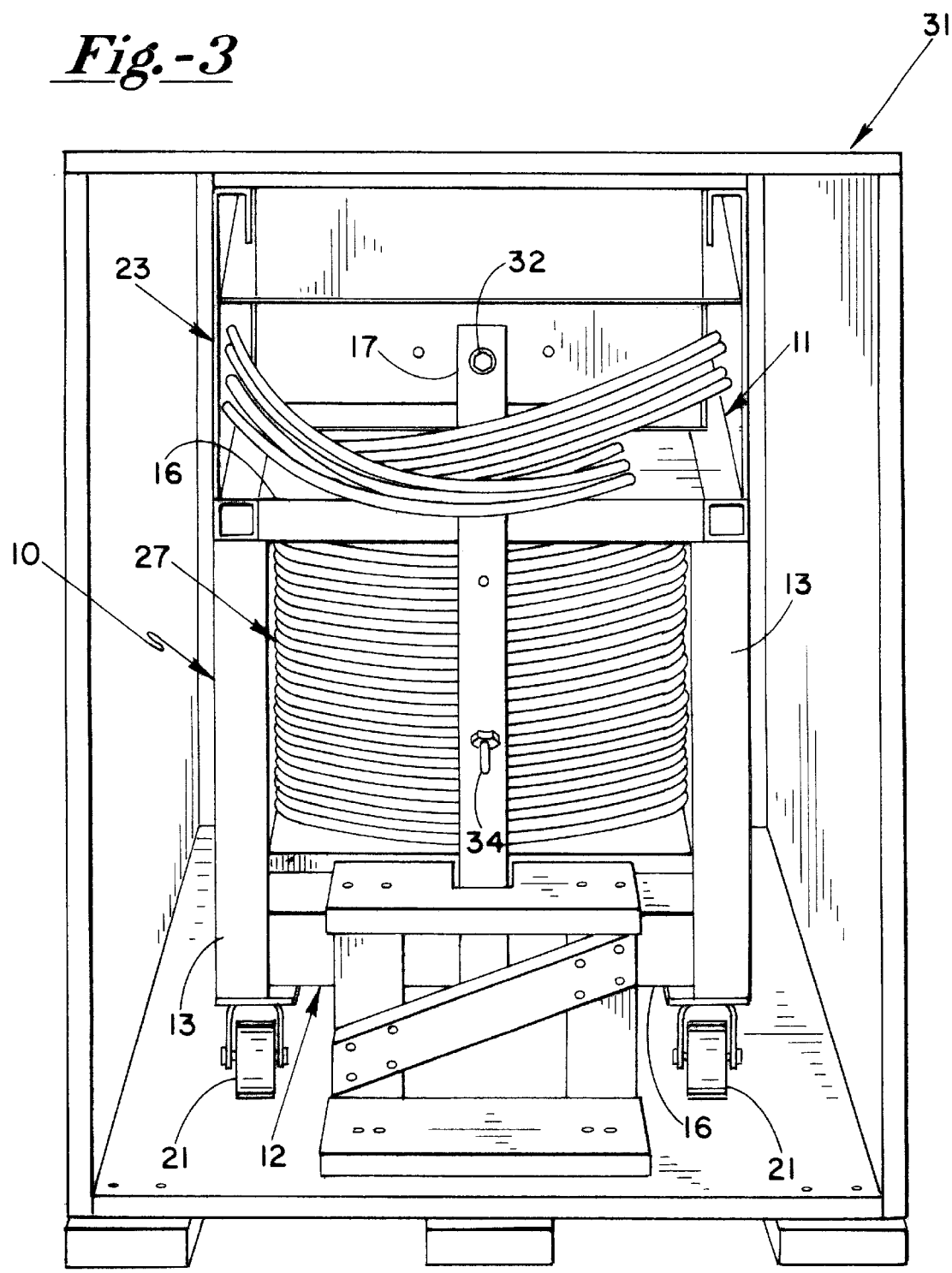
FIG. 3 is an end view of a wired bay mounted on the cart after being placed into a shipping container.

FIG. 2 illustrates cart 10 in an upright or vertical position adjacent a wired bay 23. The bay is somewhat conventional in that it comprises a generally vertical frame having vertically disposed side members 24 and upper and lower horizontal crossmembers 25A and 25B, respectively, with a multiplicity of chassis or panels 26 suitably mounted in some conventional fashion within the frame. The bay is illustrated in the position in which it will be normally placed at an installation site. The chassis or panels 26 are wired in some conventional fashion with a group of cables 27 extending outward from the chassis or panels. The cables 27 are bundled together and routed along the frame of bay 23 and are held closely to the frame by suitable cable clamps 28. When using optical fiber cables consisting of a multiplicity of optical fiber conductors it is important that the cables be routed so that they do not have any sharp bends. Typically, for illustrative purposes, a bay may be wired with eight individual cables each cable having ninety six optical fiber units or conductors. The conductors of the cables are attached only at one end to the respective panels 26 and as such may be referred to as pigtail cables. As observed in FIG. 2 with cart 13 upright or in a vertical position, cables 27 are wrapped around the cable guide pedestals 18 in the space between the two frames 11 and 12. With the cart 10 resting on casters 20 it is swung into position so that the bay 23 is face-to-face with frame 11 and the bay 23 is then releasably attached to the cart. This is done by bolt 32 through opening 19 in arm 17 threadably engaging a threaded nut 41 attached to upper crossmember 25A. This draws bay 23 upward off of its supports and foundation and secures it to cart 10. The bay may be further releasably secured to the cart by threaded bolts (not shown) through suitable openings (not shown) in lower crossmember 25B engaging suitable threaded openings (not shown) in a support member 30 attached to one end of frame 11 of cart 10. This is done to secure the wired bay 23 to cart 10 to ensure that they remain secured to one another during shipment from the fabrication site to the installation site. In some cases support arms or rests 33 (FIG. 1) which are attached to frame 11 by suitable bolts, may be needed in order to provide further support for bay 23 on cart 10.

The cart with attached bay is then lowered to bring the cart and bay to a horizontal position resting on wheels 21 and 21A on a floor or other supporting surface. Naturally the cart must be very sturdy because it is supporting and carrying a wired bay which, together with the cart, may weigh in the order of about six hundred pounds. As illustrated in FIG. 4, the cart with attached bay is lowered from the vertical to the horizontal in some conventional fashion preferably by using a power hoist, shown only in part and identified as reference numeral 40, attached to a suitable eyebolt 34 in arm 17 to raise the cart with attached bay and then lowering until the cart wheels 21 rest on the floor. The cart with attached bay is then wheeled appropriately and rolled into a shipping container 31. Typically the shipping container 31 may be a sturdy crate having adequate support members which are used to hold the cart firmly in place during shipment and generally be adequately cushioned against excess vibration to prevent any damage to the bay in transit. After it reaches the installation location the cart with the attached bay is rolled out of shipping container 31 to the installation site where the cart with attached bay is then raised, by using a power hoist (for example), to the vertical position, such as illustrated in FIG. 2. The cart is moved on casters 20 until the bay is at its installation position. Any securing bolts are disengaged and bolt 32 is unthreaded from nut 41 to lower the bay onto its permanent foundation and/or supports where it is then secured in place. Cart 10 is swung away from the bay and the cables 27-are-unwound from cable guides 18 so that they are removed from the cart and the cart is wheeled away for later reuse. It should be noted that at the installation site the reverse takes place in the step described hereinabove with reference to FIG. 4 for lowering the cart and bay from the vertical to the horizontal. A power hoist can be used to lift one end and raise the cart and bay to place them over the installation location and then lowered into place where the bay is secured as necessary and the cart removed.

In the manner described hereinabove, a bay can be wired as needed at a fabrication site without the need for bringing the fabricators to the installation site for doing the wiring which results in significant cost savings. The cart with the curved pedestal cable guides help to route the optical fiber cables and hold them fairly secure in transit to avoid any sharp bends in the cable. This potential damage to optical fiber cables is thereby considerably reduced if not totally eliminated.

We claim:

1. A method for transporting from a fabrication site to a remote installation site an electronic bay having a multiplicity of attached pig-tail cables, the steps including:
    a) providing a cart for holding the electronic bay, said cart having pedestal style cable guides;
    b) wrapping the pig-tail cables around the cart said pedestal style cable guides such that there are no sharp bends in the cables;
    c) placing the electronic bay on the cart; then
    d) moving the cart to the installation location; then
    e) removing the electronic bay from the cart and unwrapping the cables from around the cable guides.

2. The method as described in claim 1 wherein said cart has a pair of generally planar spaced-apart parallel frame members with said cable guides located between said frame members; and step c) comprises releasably securing the electronic bay to one of said frame members.

3. The method as described in claim 2 wherein step c) includes the steps of:
    raising an end of the cart so that the frame members are generally vertical; then
    releasably securing the electronic bay to one of said frame members; then
    lowering the cart so that the frame members are generally horizontal.

4. The method as described in claim 3 wherein said cart has wheels attached to the other of said frame members for moving the cart over a supporting surface when the frame members are horizontal.

5. The method as described in claim 4 wherein said cart has wheels attached to an end of said cart for moving the cart over a supporting surface when the frame members are vertical.

6. The method as described in claim 3 wherein the step of releasably securing the electronic bay to the frame member includes the step of lifting the bay by threading a bolt on the upper end of the cart into a threaded nut on the top side of said bay.

7. A cart for transporting an electronic equipment bay having cables attached at one end only to the bay, said cart comprising:
    a first rigid generally planar frame for carrying a cabled electronic bay;
    a second rigid generally planar frame generally parallel to and spaced from said first frame so that the cables extend from the bay on said first frame toward said second frame when a bay is carried by said first frame; and
    a pedestal style cable guide member attached to the cart located between said first and second frames, said cable guide member located and arranged to that cables extending from said first frame can be wrapped around the guide member.

8. The cart as described in claim 7 further including wheels attached to said second frame for moving the cart over a supporting surface.

9. The cart as described in claim 7 further including means for releasably securing an electronic equipment bay to said first frame.

10. The cart as described in claim 7 where said frames are generally horizontal when transporting the electronic equipment bay and are generally vertical when securing the bay to the cart and when releasing the bay from the cart.

11. The cart as described in claim 10 including wheel members attached to said second frame for moving the cart when the frames are horizontal and wheel members attached to an end of both frames for moving the cart when the frames are vertical.

12. The cart as described in claim 11 including means for lifting the bay for placing it on the cart and for releasably securing the bay to the cart for transporting the bay.

13. The cart as described in claim 9 wherein said means for lifting the bay and releasably securing the bay to the cart includes a threaded bolt at one end of said cart for threadably engaging a threaded nut on the bay.

* * * * *